(12) United States Patent
Kawabe et al.

(10) Patent No.: US 11,636,624 B2
(45) Date of Patent: Apr. 25, 2023

(54) CALIBRATION DEVICE AND CALIBRATION METHOD

(71) Applicant: FAURECIA CLARION ELECTRONICS CO., LTD., Saitama (JP)

(72) Inventors: Manabu Kawabe, Tokyo (JP); Morihiko Sakano, Tokyo (JP); Nobuyuki Matsuyama, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 50 days.

(21) Appl. No.: 17/593,369

(22) PCT Filed: Jul. 31, 2019

(86) PCT No.: PCT/JP2019/030098
§ 371 (c)(1),
(2) Date: Sep. 16, 2021

(87) PCT Pub. No.: WO2020/188845
PCT Pub. Date: Sep. 24, 2020

(65) Prior Publication Data
US 2022/0189065 A1 Jun. 16, 2022

(30) Foreign Application Priority Data
Mar. 20, 2019 (JP) ............................. JP2019-052738

(51) Int. Cl.
*G06T 7/80* (2017.01)
*G06T 7/246* (2017.01)
(Continued)

(52) U.S. Cl.
CPC ................ *G06T 7/80* (2017.01); *B60R 11/04* (2013.01); *G06T 7/246* (2017.01); *H04N 7/18* (2013.01);
(Continued)

(58) Field of Classification Search
CPC . G06T 7/80; G06T 7/246; G06T 2207/30241; G06T 2207/30252; B60R 11/04; H04N 7/18; H04N 7/002
See application file for complete search history.

(56) References Cited

U.S. PATENT DOCUMENTS 9,158,977 B2   10/2015   Sibiryakov
9,953,421 B2 *  4/2018   Liu ........................ G06T 7/246
(Continued)

FOREIGN PATENT DOCUMENTS

EP   3416368 A1   12/2018
JP   2008-11174 A   1/2008
(Continued)

OTHER PUBLICATIONS

Office Action issued by the Japanese Patent Office for application JP2019-052738 dated Oct. 25, 2022.
(Continued)

*Primary Examiner* — Brian P Yenke
(74) *Attorney, Agent, or Firm* — Reising Ethington, P.C.

(57) ABSTRACT

High precision calibration of external parameters is possible even when the surrounding road surface is configured from a plurality of flat surfaces. Specifically, provided is a calibration device comprising a camera to be mounted on a vehicle traveling on a road surface; a characteristic point extraction unit which extracts characteristic points from a captured image obtained by being captured with the camera; a tracking unit which tracks the characteristic points extracted with the characteristic point extraction unit; a
(Continued)

storage unit which stores a trajectory of the characteristic points obtained by tracking the characteristic points; a road surface estimation unit which estimates a flat surface on which the vehicle is traveling by using the trajectory of the characteristic points; a calculation unit which calculates a calibration trajectory, which is a trajectory of the characteristic points, for use in calibration based on the estimated flat surface; and an external parameter estimation unit which executes calibration of an external parameter of the camera by using the calibration trajectory.

7 Claims, 12 Drawing Sheets

(51) Int. Cl.
*B60R 11/04* (2006.01)
*H04N 7/18* (2006.01)
*H04N 17/00* (2006.01)

(52) U.S. Cl.
CPC . *H04N 17/002* (2013.01); *G06T 2207/30241* (2013.01); *G06T 2207/30252* (2013.01)

(56) References Cited

U.S. PATENT DOCUMENTS

| | | | |
|---|---|---|---|
| 10,165,262 B2* | 12/2018 | Arata | G06T 7/13 |
| 10,917,593 B2* | 2/2021 | Sakano | G06T 7/80 |
| 11,343,485 B1* | 5/2022 | Pighi | G06N 3/0454 |
| 11,482,016 B2* | 10/2022 | Machii | G06V 10/44 |
| 2008/0007619 A1 | 1/2008 | Shima et al. | |
| 2010/0171828 A1* | 7/2010 | Ishii | B62D 15/0275 |
| | | | 348/135 |
| 2012/0081512 A1* | 4/2012 | Shimizu | G06T 7/80 |
| | | | 348/36 |
| 2014/0139674 A1 | 5/2014 | Aoki et al. | |
| 2015/0049193 A1 | 2/2015 | Gupta et al. | |
| 2015/0222813 A1* | 8/2015 | Okude | G09B 29/10 |
| | | | 701/523 |
| 2018/0286078 A1* | 10/2018 | Kimoto | B60R 11/04 |
| 2018/0292201 A1* | 10/2018 | Sakano | G01B 11/26 |
| 2018/0324415 A1* | 11/2018 | Bovyrin | B60R 1/00 |
| 2018/0365859 A1* | 12/2018 | Oba | G06T 7/85 |
| 2019/0259178 A1* | 8/2019 | Hafner | G06T 7/248 |
| 2020/0211224 A1* | 7/2020 | Kawabe | G06V 20/56 |
| 2021/0342600 A1* | 11/2021 | Westmacott | G06V 20/56 |
| 2021/0348938 A1* | 11/2021 | McLaughlin | G06V 20/182 |
| 2021/0366154 A1* | 11/2021 | Lee | B60R 11/04 |
| 2022/0076453 A1* | 3/2022 | Sakano | G06V 20/588 |
| 2022/0245831 A1* | 8/2022 | Revaud | G06T 7/74 |
| 2022/0324421 A1* | 10/2022 | Giovanardi | G06V 20/58 |

FOREIGN PATENT DOCUMENTS

| | | |
|---|---|---|
| JP | 2018032253 A | 3/2013 |
| JP | 2014101075 A | 6/2014 |
| JP | 2015060595 A | 3/2015 |
| JP | 2019028665 A | 2/2019 |
| WO | WO2012145818 A1 | 11/2012 |

OTHER PUBLICATIONS

English Translation of the Office Action issued by the Japanese Patent Office for application JP2019-052738 dated Oct. 25, 2022.
Extended European Search Report issued for application EP 19919677.5 dated Nov. 25, 2022.

* cited by examiner

| CHARACTE-RISTIC POINT | IMAGE CAPTURE TIME AND COORDINATES | | | | | STATUS |
|---|---|---|---|---|---|---|
| | t1 | t2 | t3 | t4 | t5 | |
| 1001 | (x11,y11) | (x12,y12) | (x13,y13) | (x14,y14) | × | OK |
| 1002 | (x21,y21) | (x22,y22) | (x23,y23) | (x24,y24) | (x25,y25) | NOT OK |
| 1003 | (x31,y31) | (x32,y32) | (x33,y33) | (x34,y34) | × | OK |
| 1004 | . | (x41,y41) | (x42,y42) | (x43,y43) | × | OK |
| . | . | . | . | . | . | . |

TRACKING POINT INFORMATION

CORRECTED TRACKING POINT INFORMATION

| CHARACTE-RISTIC POINT | IMAGE CAPTURE TIME AND CORRECTED COORDINATES | | | | |
|---|---|---|---|---|---|
| | t1 | t2 | t3 | t4 | t5 |
| 1001 | (x11,y11) | (x12,y12) | (x13,y13) | (x14,y14) | × |
| 1003 | (x31a,y31a) | (x32a,y32a) | (x33a,y33a) | (x34a,y34a) | × |
| 1004 | . | (x41a,y41a) | (x42a,y42a) | (x43a,y43a) | × |
| . | . | . | . | . | . |

CALIBRATION DEVICE AND CALIBRATION METHOD

CROSS-REFERENCE TO RELATED APPLICATION(S)

This application is a U.S. National Phase Patent Application and claims priority to and the benefit of International Application Number PCT/JP2019/030098, filed on Jul. 31, 2019, which claims priority of Japanese Patent Application Number 2019-052738, filed on Mar. 20, 2019, the entire contents of all of which are incorporated herein by reference.

TECHNICAL FIELD

The present invention relates to a calibration device and a calibration method.

BACKGROUND ART

In-vehicle cameras for supporting drivers and automated driving are becoming popular. While an in-vehicle camera is mounted on a vehicle at a position and in a posture based on design, there is no avoiding a mounting error. When calculating the distance using the images captured using the in-vehicle camera, the foregoing mounting error will considerably affect the distance accuracy. Thus, measures of estimating the mounting error of an in-vehicle camera in advance as an external parameter, and giving consideration to the external parameters of the camera when calculating the distance are being widely performed. While external parameters can also be calculated using a predetermined test pattern in the factory before factory shipment, since the posture of a vehicle changes depending on the increase or decrease in the number of passengers or the shifting of heavy items in the vehicle, it is known that, strictly speaking, the external parameters also change. Thus, there are demands for estimating, or calibrating, the external parameters while a vehicle is traveling on the road. If it is possible to calibrate the external parameters while the vehicle is traveling, it will be possible to omit the calculation of the external parameters before factory shipment, and this will contribute to the reduction of work processes. PTL 1 discloses a calibration device of an in-vehicle camera characterized in comprising an in-vehicle camera, a camera parameter calculation unit which calculates a camera parameter consisting of an installation height and angle of the in-vehicle camera during image capture from a characteristic amount of a road surface sign captured with the in-vehicle camera and recognized based on image processing, and a camera parameter correction unit which performs optical axis correction control of the in-vehicle camera based on the camera parameter output by the camera parameter calculation unit.

CITATION LIST

Patent Literature

[PTL 1] Japanese Unexamined Patent Application Publication No. 2008-11174

SUMMARY OF THE INVENTION

Problems to be Solved by the Invention

With the invention described in PTL 1, high precision calibration of external parameters is difficult when the surrounding road surface is not flat.

Means to Solve the Problems

The calibration device according to a first mode of the present invention comprises a camera to be mounted on a vehicle traveling on a road surface; a characteristic point extraction unit which extracts characteristic points from a captured image obtained by being captured with the camera; a tracking unit which tracks the characteristic points extracted with the characteristic point extraction unit; a storage unit which stores a trajectory of the characteristic points obtained by tracking the characteristic points; a road surface estimation unit which estimates a flat surface on which the vehicle is traveling by using the trajectory of the characteristic points; a calculation unit which calculates a calibration trajectory, which is a trajectory of the characteristic points, for use in calibration based on the estimated flat surface; and an external parameter estimation unit which executes calibration of an external parameter of the camera by using the calibration trajectory.

The calibration method according to a second mode of the present invention is a calibration method to be executed by a calibration device mounted on a vehicle traveling on a road surface and comprising a camera and a storage unit, comprising the steps of: extracting characteristic points from a captured image obtained by being captured with the camera and tracking the characteristic points; storing a trajectory of the characteristic points obtained by tracking the characteristic points in the storage unit; estimating a flat surface on which the vehicle is traveling by using the trajectory of characteristic points; calculating a calibration trajectory, which is a trajectory of the characteristic points, for use in calibration based on the estimated flat surface; and executing calibration of an external parameter of the camera by using the calibration trajectory.

The calibration program according to a third mode of the present invention causes a calibration device mounted on a vehicle traveling on a road surface and comprising a camera and a storage unit to execute the steps of: extracting characteristic points from a captured image obtained by being captured with the camera and tracking the characteristic points; storing a trajectory of the characteristic points obtained by tracking the characteristic points in the storage unit; estimating a flat surface on which the vehicle is traveling by using the trajectory of the characteristic points; calculating a calibration trajectory; which is a trajectory of the characteristic points, for use in calibration based on the estimated flat surface; and executing calibration of an external parameter of the camera by using the calibration trajectory.

Advantageous Effects of the Invention

According to the present invention, high precision calibration of external parameters is possible even when the surrounding road surface is configured from a plurality of flat surfaces.

BRIEF DESCRIPTION OF DRAWINGS

FIG. 2(a) is a diagram showing an example of the tracking point information 102A, and FIG. 2(b) is a diagram showing an example of the corrected tracking point information 102B.

DESCRIPTION OF EMBODIMENTS

First Embodiment

The first embodiment of the calibration device according to the present invention is now explained with reference to FIG. 1 to FIG. 10.

Figure 1:
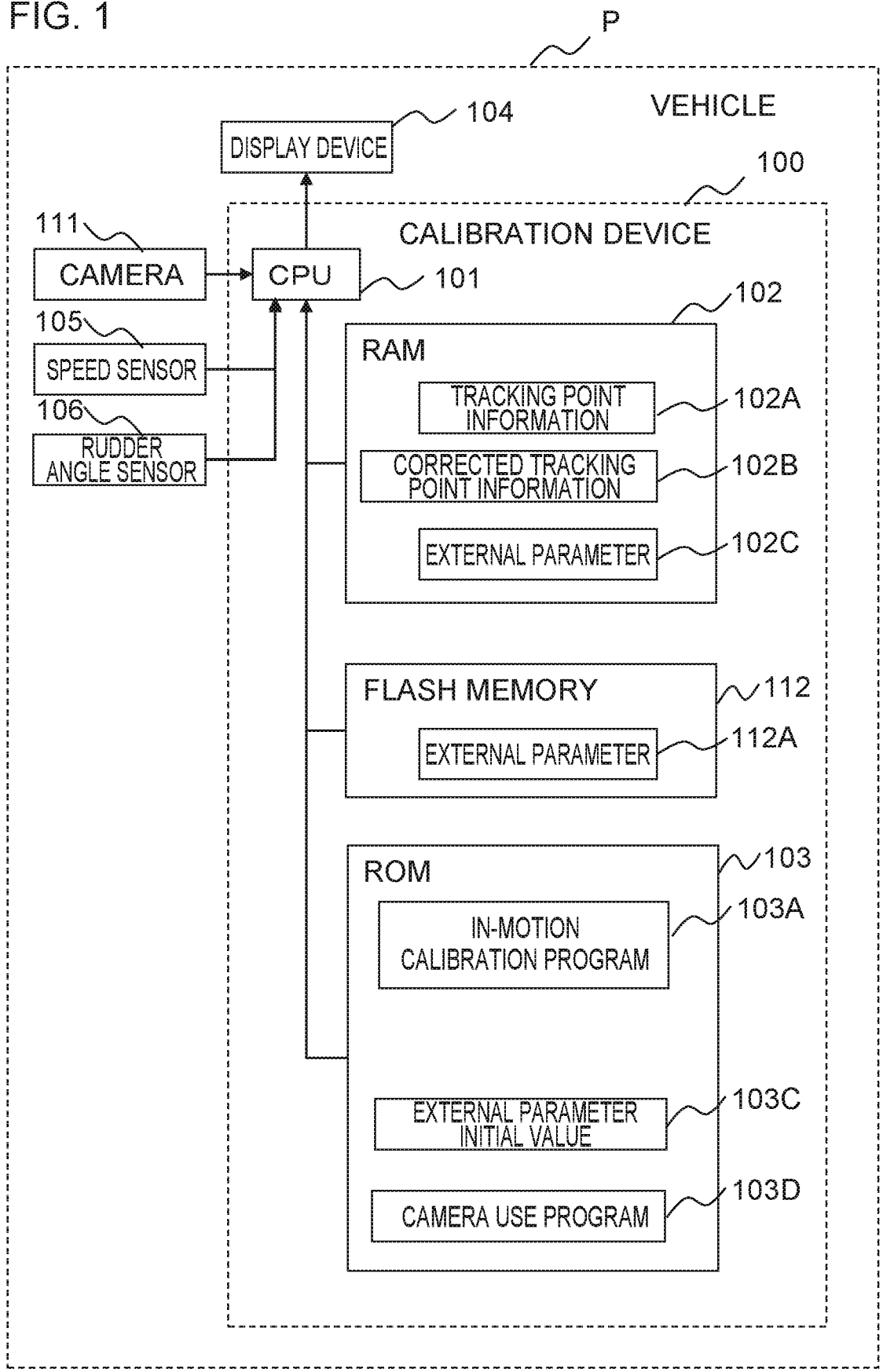
FIG. 1 is a block diagram showing the configuration of the vehicle P comprising the calibration device 100.

FIG. 1 is a block diagram showing the configuration of a calibration device 100 according to the present invention, and a vehicle P comprising the calibration device 100. Note that, in this embodiment, the vehicle P may be referred to as the "own vehicle" P for differentiation from the other vehicles.

The vehicle P comprises a calibration device 100, a camera 111 which captures images of an area in front of the vehicle P, a display device 104 which presents information to a driver based on an output of the calibration device 100, a speed sensor 105 which measures a speed of the vehicle P, and a rudder angle sensor 106 which measures a rudder angle of the vehicle P, Information acquired by the camera 111, the speed sensor 105, and the rudder angle sensor 106 is sent to the calibration device 100.

The camera 111 is mounted, for example, at the front part of the vehicle P, and captures images of the periphery of the vehicle P. The image capture range of the camera 111 includes a road surface on which the vehicle P travels. A designed value of the position/posture relation of the camera 111 relative to the vehicle P is stored as an external parameter initial value 103C in a flash memory 112 described later. Nevertheless, there is no avoiding a deviation in the mounting of the camera 111 on the vehicle P from the designed value, and an ideal external parameter corresponding to the actual mounting status and the external parameter initial value 103C as the designed value will not coincide.

The camera 111 comprises a lens and an imaging element, and the characteristics thereof, such as the lens distortion coefficient as a parameter which indicates the distortion of the lens, optical axis center, focal length, number of pixels and dimension of the imaging element, are stored as internal parameter initial values in a ROM 103. Moreover, an external parameter 112A calculated based on a calibration program described later is stored in the flash memory 112.

The calibration device 100 comprises a CPU 101 as a central processing unit, a RAM 102 as a random access memory, a ROM 103 as a read only memory, and a flash memory 112. The CPU 101 is connected to the RAM 102, the RAM 103, and the flash memory 112 via a signal line.

The CPU 101 executes a program stored in the ROM 103 by reading such program into the RAM 102. The RAM 102 stores tracking point information 102A, corrected tracking point information 102B, and an external parameter 102C to be used by the programs described later. The structure of the tracking point information 102A and the corrected tracking point information 102B will be described later. The external parameter 102C is an interim value during the calibration process, and is used by being overwritten until the calibration is completed.

The ROM 103 stores an in-motion calibration program 103A, an external parameter initial value 103C, and a camera use program 103D. The in-motion calibration program 103A calibrates an external parameter while the vehicle P is traveling. The operation of the in-motion calibration program 103A will be described later.

The external parameter initial value 103C is a designed value of an external parameter as described above. The camera use program 103D is a program for using the camera 111 and, for instance, calculates a distance between the own vehicle P and vehicles in the periphery using the images obtained by being captured with the camera 111, and displays a warning on the display device 104 when the calculated distance becomes a predetermined distance or less. The camera use program 103D requires an external parameter and an internal parameter of the camera 111 to be executed, and reads such external parameter and internal parameter from the flash memory 112. When the external parameter 112A and the internal parameter are not stored in the flash memory 112, the camera use program 103D uses the internal parameter initial value and the external parameter initial value 103C stored in the ROM 103.

The flash memory 112 is a non-volatile memory medium, and the flash memory 112 stores the external parameter 112A output by the in-motion calibration program 103A. Note that, while this embodiment only explains the calibration of an external parameter, the calibration device 100 may also perform the calibration of an internal parameter.

(Tracking Point Information 102A)

FIG. 2(a) is a diagram showing an example of the tracking point information 102A stored in the RAM 102. The tracking point information 102A stores, for each characteristic point, information regarding the coordinates and status. Nevertheless, information regarding the coordinates for each characteristic point is stored for each image capture time. In other words, since coordinates to which the characteristic points moved are recorded in [••], the characteristic points recorded in [••] are hereinafter sometimes referred to as the "characteristic point trajectory".

The lines of FIG. 2(a) represent individual characteristic points, and the columns of FIG. 2(a) represent the coordinates of the characteristic point on the captured image at image capture time t1 to image capture time t5, and the tracking status of the corresponding characteristic point. In the following explanation, the coordinates on the captured image are also sometimes referred to as the coordinates of the "image coordinate system". In this embodiment, an image coordinate system is defined with the upper left of the captured image as the origin, the right side of the captured image as the forward direction of the X axis, and the bottom of the captured image as the forward direction of the Y axis.

Note that the image capture time only requires information sufficient for calculating the travel speed of the characteristic point trajectory described later. For example, the image capture time may be an actual time such as "Jan. 2, 2019; 3:45; 12.345 seconds", or a predetermined time such as the elapsed time from the time that the power of the calibration device 100 was previously turned on.

The number assigned to the characteristic point, such as 1001 or 1002, is an identifier for identifying the characteristic point, and in this example serial numbers are assigned to the characteristic points in the order that they were extracted for the sake of convenience. FIG. 2(a) shows that three characteristic points were extracted from the captured image that was captured at time t1, and similarly that four characteristic points were extracted from the captured images that were captured at time t2, time t3, and time t4, one characteristic point was extracted from the captured image that was captured at time t5, and that the tracking was successful. FIG. 2(a) shows that the tracking of three characteristic points among the four characteristic points extracted from the captured images that were captured at time t2 and time t3; that is, the tracking of the characteristic point 1001, the characteristic point 1002 and the characteristic point 1003, is continuing from time t1.

Since the characteristic points 1001, 1003, and 1004 were not extracted from the captured image that was captured at time t5, an "x" mark has been indicated in FIG. 2(a). Note that, while the example shown in FIG. 2(a) only displays time t1 to time #5, the time is not limited thereto. Since the table size will increase infinitely when the time is increased and thus result in the excessive use of the memory, the table is cyclically utilized based on a publicly known ring buffer technology or the like.

The "status" column of the tracking point information 102A stores information showing whether the tracking of the characteristic point is complete. In the example shown in FIG. 2(a), "OK" is stored in the characteristic point status column when the tracking of the characteristic point is complete, and "Not OK" is stored in the characteristic point status column when the tracking of the characteristic point is not complete.

(Corrected Tracking Point Information 102B)

FIG. 2(b) is a diagram showing an example of the corrected tracking point information 102B stored in the RAM 102. The corrected tracking point information 102B stores the coordinates that were corrected at each time for each characteristic point. The coordinates indicated in the corrected tracking point information 102B are the coordinates in the captured image system as with the tracking point information 102A.

Figure 3:
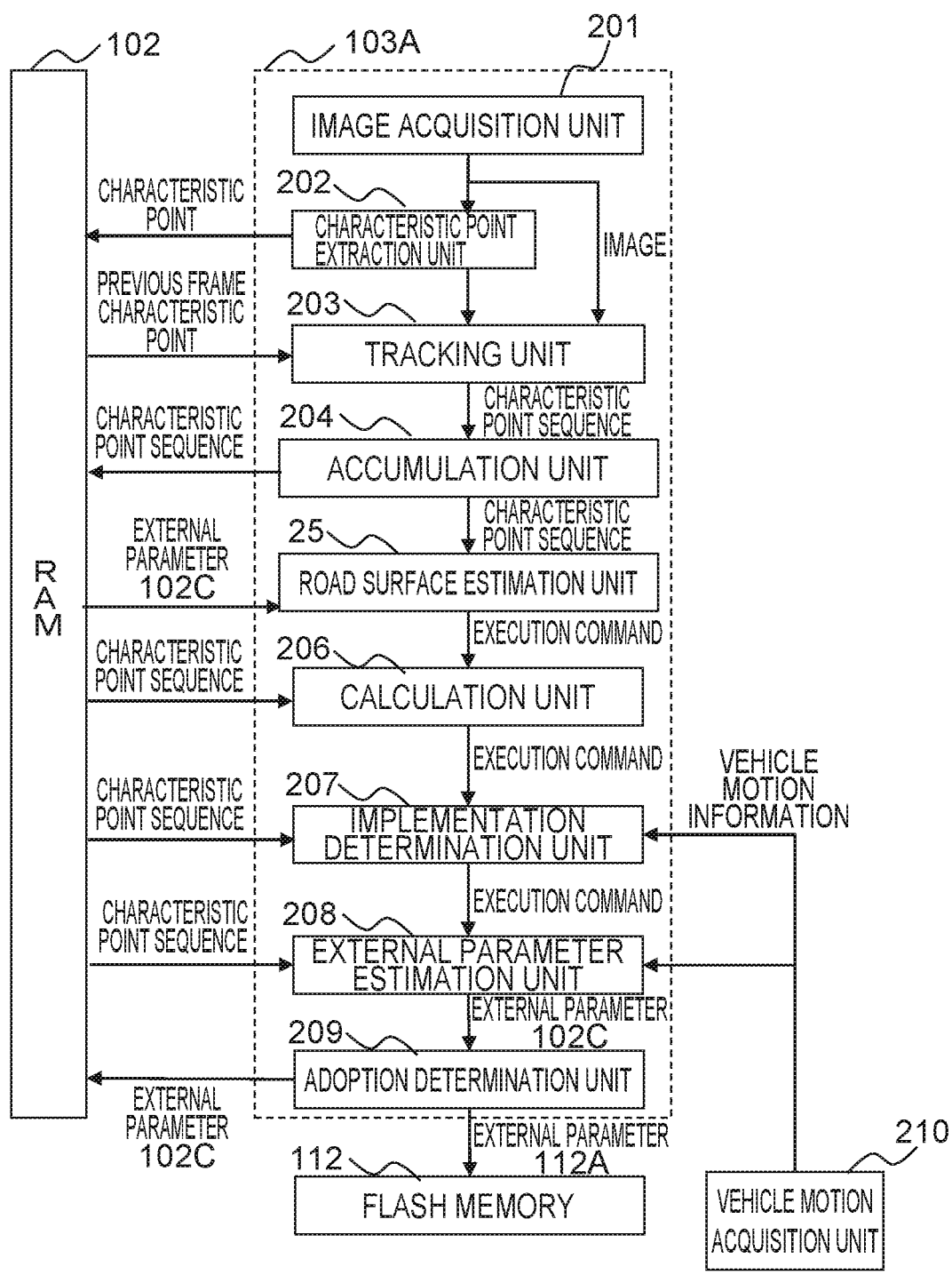
FIG. 3 is a functional block diagram of the in-motion calibration program 103A.

Among the characteristic points indicated in the tracking point information 102A, information of the characteristic point in which the tracking is complete is described in the corrected tracking point information 102B. Moreover, since there are also characteristic points that do not need to be corrected as described later, the coordinates of those characteristic points are the same as the tracking point information 102A. For instance, while the example of FIG. 2(b) shows the characteristic points 1001, 1003, and 1004, since the characteristic point 1001 among the characteristic points 1001, 1003, and 1004 does not need to be corrected, the coordinates of the characteristic point 1001 are the same as the tracking point information 102A. Meanwhile, since the characteristic points 1003 and 1004 have been corrected, the coordinates of the characteristic points 1003 and 1004 have also been corrected. For example, while the coordinates of the characteristic point 1003 at time #1 were (x31, y31) in the tracking point information 102A, they have been corrected to (x31a, y31a) in the corrected tracking point information 102B. FIG. 3 is a diagram representing the functional blocks of the functions of the in-motion calibration program 103A to be executed by the CPU 101, and shows the flow of data between the functional blocks and between the functional blocks and the RAM 102.

The in-motion calibration program 103A comprises, as its functions, an image acquisition unit 201, a characteristic point extraction unit 202, a tracking unit 203, an accumulation unit 204, a road surface estimation unit 205, a calculation unit 206, an implementation determination unit 207, an external parameter estimation unit 208, an adoption determination unit 209, and a vehicle motion acquisition unit 210. Note that the vehicle motion acquisition unit 210 is shown outside the in-motion calibration program 103A in FIG. 3 for the sake of drawing the diagram. The image acquisition unit 201, the characteristic point extraction unit 202, and the tracking unit 203 are executed each time the camera 111 captures an image.

The camera 111 captures images in succession at a high frequency, such as thirty times per second. The image obtained by being captured with the camera 111 (hereinafter referred to as the "captured image") is sent to the calibration device 100 each time an image is captured. The image acquisition unit 201 receives the captured image from the camera 111, and outputs the received captured image to the characteristic point extraction unit 202, and the tracking unit 203. The image acquisition unit 201 outputs, for example, the captured image to the characteristic point extraction unit 202 and the tracking unit 203 each time the captured image is input from the camera 111. Nevertheless, the image acquisition unit 201 may also be configured to output the captured image every other time in order to reduce the processing load.

The vehicle motion acquisition unit 210 outputs, to the in-motion calibration program 103A, the speed and rudder angle of the own vehicle P sent from the speed sensor 105 and the rudder angle sensor 106 as the vehicle motion information. Nevertheless, the vehicle motion acquisition unit 210 may also output the obtained information as an instantaneous value, or operate the obtained information and, for example, integrate the information and output the result.

The characteristic point extraction unit 202 extracts the characteristic point by performing image processing to the captured image input from the image acquisition unit 201. The term "characteristic point" as used herein refers to the intersection point of edges such as the corner of walls, corner of curbs, corner of broken lines or corner of crosswalks in the image; that is, a characteristic point can also be referred to as a corner characteristic point. A corner characteristic point can be extracted, for example, by applying the Harris operator which is a known technology. The characteristic point extraction unit 202 outputs, to the RAM 102, the coordinates of the extracted characteristic point in the image coordinate system. Information of the characteristic point extracted by the characteristic point extraction unit 202 is stored in the RAM 102.

The tracking unit 203 performs tracking processing, by using the latest captured image input from the image acquisition unit 201, to the characteristic point obtained from the immediately preceding captured image, that is, the characteristic point of the preceding frame, to be read from the RAM 102. In other words, the tracking unit 203 tracks the characteristic point in the captured image that was captured at a different time, and thereby calculates the trajectory of the characteristic point. The tracking of the characteristic point can be performed based on known tracking methods such as SAD (Sum of Absolute Difference), SSD (Sum of Squared Difference), or LK (Lucas-Kanade). Furthermore, information related to the tracked characteristic point is output to the tracking unit 203.

The accumulation unit 204 records information of the characteristic point trajectory output from the tracking unit 203, as the tracking point information 102A, in the RAM 102. Furthermore, the accumulation unit 204 outputs, to the road surface estimation unit 205, information of the characteristic point trajectory output from the tracking unit 203. The road surface estimation unit 205 calculates a road surface of the road on which the own vehicle P travels by using information of the characteristic point trajectory recorded in the RAM 102. The calculation unit 206 calculates the characteristic point trajectory suitable for calibration by using information of the characteristic point trajectory recorded in the RAM 102, and records the calculated characteristic point trajectory as the corrected tracking point information 102B in the RAM 102. Details of the road surface estimation unit 205 and the calculation unit 206 will be described later.

The implementation determination unit 207 determines whether or not to implement calibration. When calibration is implemented in a state where the total number of characteristic point trajectories is small, the error of the calibration result will be considerable if an error sequence is contained therein. Thus, calibration is implemented at the stage that the number of characteristic point trajectories is accumulated to a predetermined number of characteristic point trajectories that is prescribed in advance. Moreover, when implementing calibration, characteristic point trajectories are required respectively in the left side region and the right side region of the traveling direction viewed from the center of the own vehicle. The implementation determination unit 207 refers to the corrected tracking point information 102B and outputs an execution command to the external parameter estimation unit 208 when a predetermined number of characteristic point trajectories prescribed in advance have been obtained respectively in the left side region and the right side region when viewed from the center of the own vehicle.

The external parameter estimation unit 208 calculates an external parameter of the camera 111 by assuming that the trajectory of the obtained characteristic point exists on the same plane. The external parameter estimation unit 208 performs overhead view conversion so that the position of the characteristic point trajectory calculated with the calculation unit 206; that is, the position of the characteristic point recorded in the corrected tracking point information 102B, is looked down from above the own vehicle P using the current external parameter 102C. Subsequently, the external parameter estimation unit 208 estimates the tri-axis angle and height of the camera by using the angle and length of the characteristic point trajectory from the overhead viewpoint. The tri-axis angle is a roll angle, a pitch angle, and a yaw angle of the camera. Since the trajectory of the acquired characteristic point is the characteristic point trajectory acquired from the flat surface of the road surface with which the vehicle P comes into contact when the vehicle P is traveling straight ahead, if the tri-axis angle and height of the camera coincide with the external parameter 102C, a plurality of characteristic point trajectories in an overhead viewpoint will be parallel and vertical in the overhead view longitudinal direction, and will be a predetermined length. This characteristic point trajectory is the ideal trajectory.

If the tri-axis angle and height of the camera do not coincide with the external parameter 102C used as the operator; that is, if there is an error in the external parameter 102C, a characteristic difference will arise in the characteristic point trajectory in the overhead viewpoint relative to the ideal trajectory. If there is an error in the pitch angle, the characteristic point trajectory in the overhead viewpoint will open in an inverted v shape. If there is an error in the yaw angle, a difference in the length will arise in the left and right characteristic point trajectories of the own vehicle P in the overhead viewpoint. If there is an error in the roll angle, the overall characteristic point trajectory will rotate diagonally. If there is an error in the camera height, a difference will arise in the length of the characteristic point trajectory in comparison to a predetermined length.

The external parameter estimation unit 208 realizes calibration by changing the respective parameters and correcting the respective parameters by using a publicly known optimization technique to bring it closer to the ideal trajectory. The details will be described later. After the estimation based on optimization processing, the external parameter 102C is output to the adoption determination unit 209.

The adoption determination unit 209 receives the output from the external parameter estimation unit 208, and determines whether that parameter may be adopted as the final parameter. When it is determined that the parameter may be adopted as the final parameter, the external parameter 102C is written in the flash memory 112 as the external parameter 112A. When it is determined that the parameter should not be adopted as the final parameter, it is written in the RAM 102 as the external parameter 102C that is being estimated, and used as the initial value when the next image is input.

The adoption determination unit 209 determines whether the parameter may be adopted as the final parameter from the three perspectives of convergence determination, frequency determination, and image determination. Convergence determination is the determination of whether the variation in comparison to past values is sufficiently small. Frequency determination is the determination of whether the same value is obtained within a predetermined range by performing validation multiple times. Image determination is the determination of performing validation of the overhead view image and whether it is a picture that can be deemed a proper overhead view.

The adoption determination unit 209 determines that the parameter may be adopted as the final parameter when the convergence determination, the frequency determination, and the image determination are all satisfied, and writes the parameter in the flash memory 112. When the adoption determination unit 209 determines that only the convergence determination and the image determination are satisfied, the adoption determination unit 209 counts up the frequency that satisfied the frequency determination, clears the characteristic point sequence stored in the RAM 102 and the external parameter 102C that is being operated, and restarts the process from the initial state.

(Overview of Operation of Road Surface Estimation Unit 205)

Figure 4A:
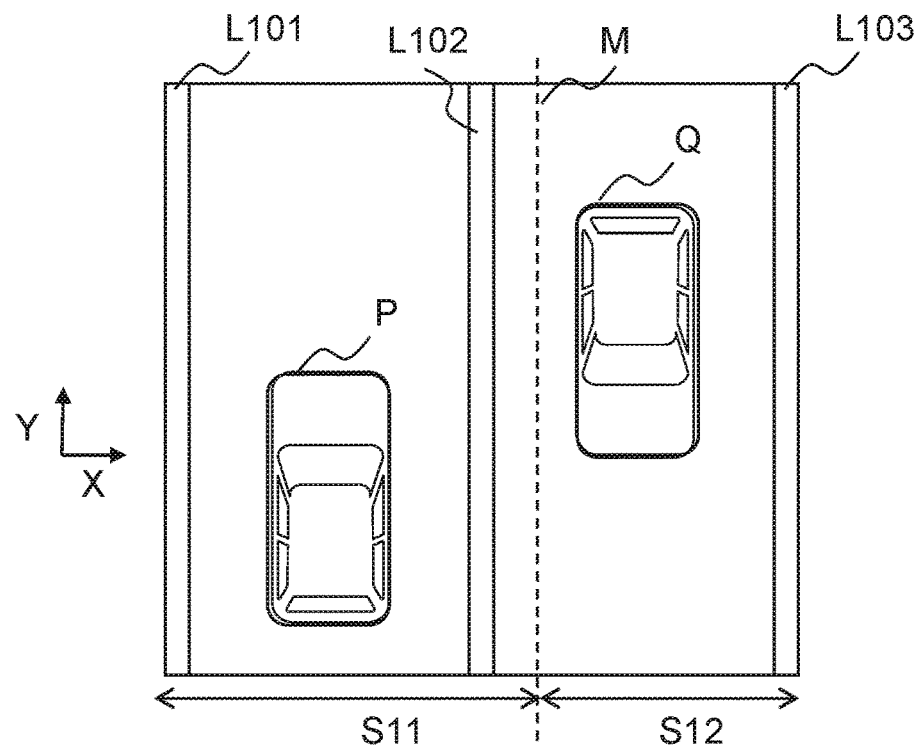
FIG. 4(a) is a plan view of the road.
Figure 4B:
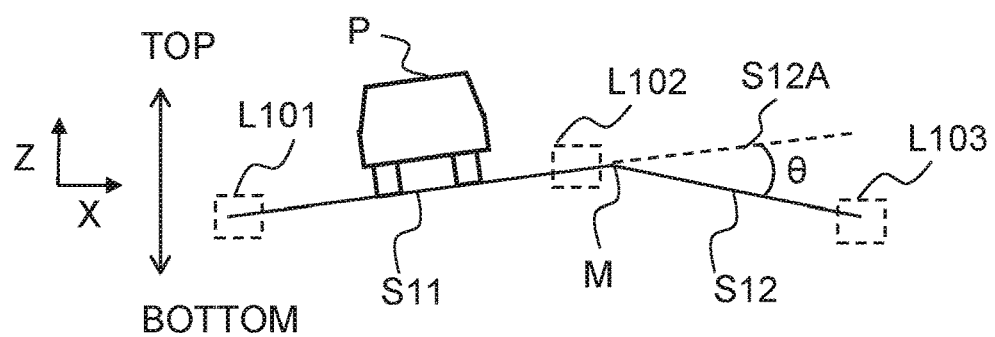
FIG. 4(b) is a cross section of the road.
Figure 4C:
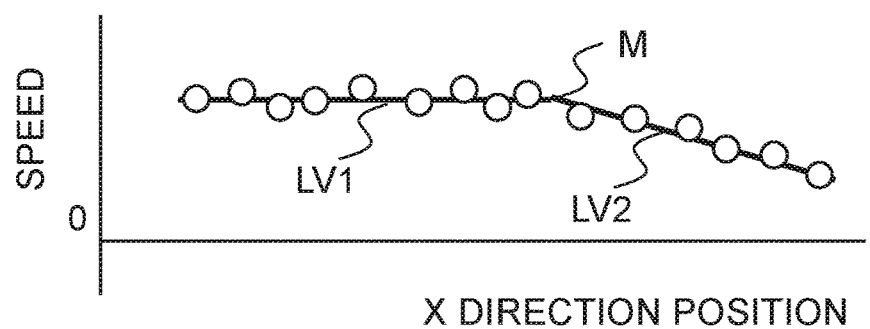
FIG. 4(c) is a diagram showing the travel speed of the characteristic points.

FIG. 4 is a diagram explaining the concept of the road surface estimation processing performed by the road surface estimation unit 205. FIG. 4(a) is a plan view of the road, FIG. 4(b) is a cross section of the road, and FIG. 4(c) is a diagram showing the travel speed of the characteristic points. In FIG. 4(a) to FIG. 4(c), the common XYZ axis is defined. Nevertheless, in order to differentiate the X axis and the Y axis in the image coordinate system, the coordinate system shown in FIG. 4 is referred to as the "spatial coordinate system". In the spatial coordinate system, the X axis is parallel to the width direction of the road, the Y axis is parallel to the traveling direction of the own vehicle P, and the Z axis shows the vertical direction. In FIG. 4(a), the own vehicle is the vehicle shown with the reference numeral P, and a white line L101, a center line L102, and a white line L103 are drawn on the roadway. An oncoming vehicle Q is traveling on the other side of the own vehicle P across the center line L102. A broken line M is the vertex of the gradient, and will be explained in detail later.

The roadway on which the vehicle P travels is required to have a gradient, or a cross slope, of several % in the width direction of the roadway pursuant to laws for discharging rainwater or the like. Thus, the roadway is often configured such that the center part thereof is high and becomes gradually lower toward the width direction of the road. Nevertheless, there are cases where the vertex position of the cross slope and the center part of the center line L102 in the width direction do not coincide. In the example shown in FIG. 4, the vertex M of the gradient is positioned more on the right side in the diagram than the center line L102.

FIG. 4(b) is a cross section of the road, and the position in the lateral direction in the diagram corresponds to FIG. 4(a). The vertical direction illustrated in FIG. 4(b) corresponds to the top-bottom direction, and the positions of the white line L101 and the white line L103 on the left and right ends in the diagram are the lowest, and the position closer to the center part of the road is higher. Nevertheless, the vertex M that is slightly right of the center line L102 is the highest. In the example shown in FIG. 4, the shape of the cross section is uniform irrespective of the Y direction; that is, the road shown in FIG. 4 is configured from a first plane S11 on the left side of the vertex M and a second plane S12 on the right side of the vertex M. The first plane S11 can also be referred to as the plane with which the vehicle P is in contact. In the following explanation, the flat surface formed by extending the first plane S11 beyond the vertex M is referred to as the virtual second plane 512A. The angle formed with the second plane S12 and the virtual second plane S12A is referred to as an angular difference θ.

FIG. 4(c) is a conceptual diagram showing the relationship of the position of the detected characteristic point trajectory and the travel speed. Nevertheless, in FIG. 4(c), it is assumed that all characteristic points exist on the same plane as the contact area of the own vehicle P; that is, exist on the first plane Si 1 or the virtual second plane 512A. The respective white circles shown in FIG. 4(c) are the characteristic point trajectory, and show that the travel speed is higher as they exist higher in the diagram. The characteristic point existing on the first plane S11, which is on the same plane as the own vehicle P, is observed as having moved from the own vehicle P at the same speed in the reverse direction as the moving direction of the own vehicle P when the own vehicle P has moved since that characteristic point is fixed to the ground. Nevertheless, since the characteristic point existing on the second flat surface S12 is assumed as existing on the virtual second plane 512A, it is calculated as the position projected on the virtual second plane S12, and observed to be moving at a slower travel speed than the actual speed.

In FIG. 4(c), the distribution of these characteristic point trajectories is approximate at the two straight lines of LV1 and LV2. Note that the position of the intersection point of LV1 and LV2 in the road width direction coincides with the position of the vertex M. The difference in the inclination of LV1 and LV2 corresponds to the angle formed with the first plane S11 and the second plane 312; that is, corresponds to the angular difference θ.

In other words, by evaluating the speed of the characteristic point trajectories, the road surface estimation unit 205 calculates the position of the vertex M and the angle formed with the first plane S11 and the second plane S12. Specifically, the approximation straight line is obtained with the least-square method or the like from the respective points of LV1 and LV2, and, when the approximation straight line obtained from LV1 is:

$$y=a1*x+b1 \quad \text{Formula 1; and}$$

when the approximation straight line obtained from LV2 is:

$$y=a2*x+b2 \quad \text{Formula 2,}$$

the x coordinates of the intersection point M can be obtained from:

$$M=-(b1-b2)/(a1-a2) \quad \text{Formula 3.}$$

Moreover, this is also obtained from:

$$\theta=k*(\arctan(a1)-\arctan(a2)) \quad \text{Formula 4}$$

Here, k is a proportional constant that is a value that differs based on the camera arrangement based on the model. Moreover, arctan is the inverse function of the tangent function (tangent). Based on this calculation formula, the angular difference θ shown in FIG. 4(b) is calculated from the relation of LV1 and LV2 shown in FIG. 4(c).

(Overview of Operation of Calculation Unit 206)

Figure 5A:
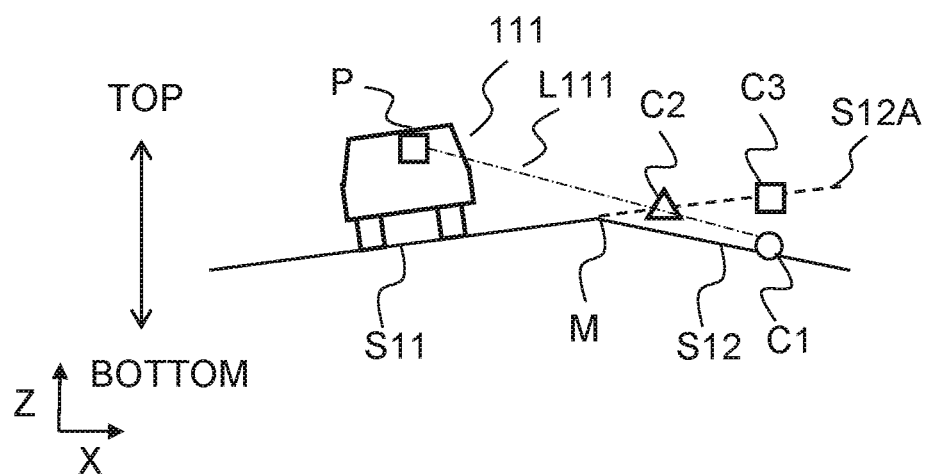
FIG. 5(a) is a cross section of the road.
Figure 5B:
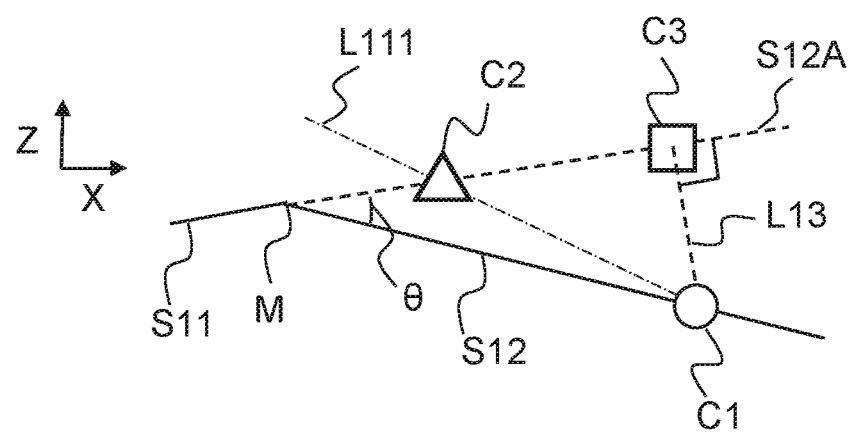
FIG. 5(b) is a diagram showing the calculated characteristic point position.

FIG. 5 is a conceptual diagram showing the characteristic points calculated by the calculation unit 206. The calculation unit 206 directly outputs the characteristic point trajectory existing on the first plane S11 among the characteristic point trajectories recorded in the RAM 102, and corrects, and outputs, the position of the characteristic points configuring the characteristic point trajectory existing outside the first plane S11. The calculation unit 206 determines whether the characteristic point trajectory exists on the first plane 311 based on the X coordinates of the characteristic point, the X coordinates of the own vehicle P, and the X coordinates of the vertex M. Specifically, of the regions divided in two based on the X coordinates of the vertex M, the region on the side where the own vehicle P exists can be determined as the first plane S11. The correction of the position of the characteristic points existing outside the first plane 311 is now explained.

The own vehicle P, the first plane 311, the second plane S12, the virtual second plane 512A, and the vertex M shown in FIG. 5(a) are the same as FIG. 4(b). Reference numeral 111 represents the camera 111 of the calibration device 100. The circle shown with reference numeral C1 represents the true position of the characteristic point, and is hereinafter referred to as the "true characteristic point position" C1 in the following explanation. The triangle shown with reference numeral C2 represents the position of the characteristic point calculated in a simple manner, and is hereinafter referred to as the "simple characteristic point position" C2 in the following explanation. The quadrangle shown with reference numeral C3 represents the position of the characteristic point calculated by using calibration, and is hereinafter referred to as the "calculated characteristic point position" C3 in the following explanation.

While a characteristic point is extracted from a captured image of the camera 111, the depth cannot be calculated only from a single captured image. Assuming that the characteristic point exists on a first flat surface 311 and on a flat surface including the first flat surface S11, the characteristic point C1 is calculated as existing at the position C2. Nevertheless, based on the calculation of the road surface estimation unit 205, the relation of the second plane 312 as the flat surface on which the characteristic point C1 exists and the angle formed with the first flat surface Si 1 was revealed. Thus, the calculation unit 206 can calculate the position of the characteristic point shown with C3. The position C3 is defined as the position where the straight line L13, which is perpendicular to the virtual second plane S12A with the position C3 as the starting point, intersects with the characteristic point C1

(Flowchart of Characteristic Point Extraction Unit 202)

Figure 6:
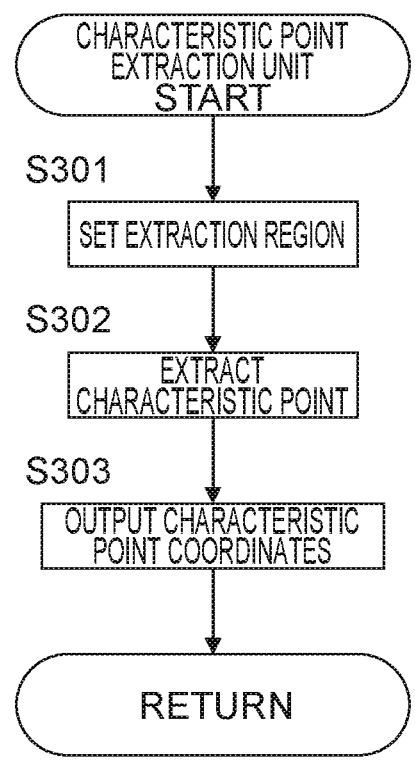
FIG. 6 is a flowchart showing the operation of the characteristic point extraction unit 202.

FIG. 6 is a flowchart showing the operation of the characteristic point extraction unit 202. The characteristic point extraction unit 202 executes the following operation each time a captured image is sent from the image acquisition unit 201. The execution subject of each step explained below is the CPU 101.

In step S301, the characteristic point extraction unit 202 decides the region in the captured image from which the characteristic point extraction unit 202 extracted the characteristic point based on the traveling direction of the vehicle P and the image capture direction of the camera 11 relative to the traveling direction of the vehicle P. For example, when the vehicle P travels forward, since the camera 111 is mounted at the front of the vehicle P, even if the characteristic point is extracted at a position near the vehicle P, the characteristic point will quickly deviate from the angle of view of the camera 111, and the time that the characteristic point can be tracked will be short. Since the time required for the calculation processing will be longer as the processing region is broader, the calculation processing load of such wasteful parts needs to be reduced for performing the calculation based on real-time processing. Thus, a processing region for extracting the characteristic point of a place separated from the vehicle P is set. When the camera 111 is mounted so as to capture the images of the area behind the vehicle P, a processing region on the side near the vehicle P is set when the vehicle P travels forward. The characteristic point extraction unit 202 then proceeds to step S302.

In step S302, the characteristic point extraction unit 202 extracts the characteristic point from the characteristic point extraction region set in step S301. In particular, it would be preferable to extract the corner characteristic point, which is the intersection point of edges. The characteristic point extraction unit 202 extracts the corner characteristic point by applying the Harris operator or the like to the region set in step S301, and then proceeds to step S303. In step S303, the characteristic point extraction unit 202 outputs the coordinates of the characteristic point extracted in step S302 to the RAM 102, and then ends the flowchart of FIG. 6.

(Flowchart of Tracking Unit 203)

Figure 7:
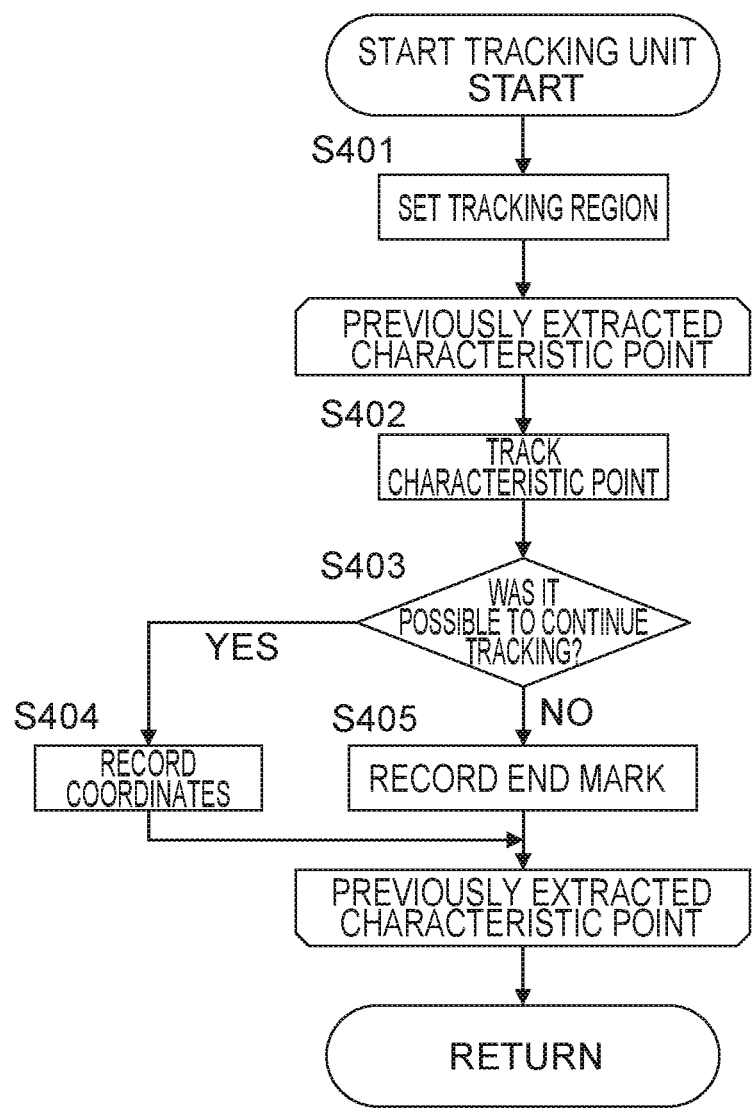
FIG. 7 is a flowchart showing the operation of the tracking unit 203.

FIG. 7 is a flowchart showing the operation of the tracking unit 203. The tracking unit 203 executes the following operation each time a captured image is sent from the image acquisition unit 201. The execution subject of each step explained below is the CPU 101.

In step S401, the tracking unit 203 sets the processing region to be subject to the tracking processing of the characteristic point. In other words, in the captured image that was captured previously by the camera 111, the direction and distance that the characteristic point extracted in the immediately preceding captured image are estimated by using the coordinates in which the characteristic point was extracted by the characteristic point extraction unit 202 and the motion information of the vehicle P acquired by the vehicle motion acquisition unit 210. The region corresponding to the estimated direction and distance in which the characteristic point will move is decided as the region in the captured image that the tracking unit 203 is to track the characteristic point. The tracking unit 203 then proceeds to step S402.

Nevertheless, the captured image to be used for estimating the direction and distance in which the characteristic point will move is not limited to the immediately preceding captured image, and the estimation may also be performed by using a plurality of captured images, or the estimation may be performed using captured images other than the immediately preceding captured image. In other words, the direction and distance in which the characteristic point will move may be estimated using a captured image that was captured at an earlier time.

Steps S402 to S405 explained next are repeatedly executed only in the number of times corresponding to the characteristic points extracted in the immediately preceding captured image. In step S402, the tracking unit 203 tracks the characteristic points in the immediately preceding captured image read from the RAM 102 to be subject to tracking based on a publicly known method described above such as the SAD method or the LK method, and then proceeds to step S403. In step S403, the tracking unit 203 determines whether it was possible to continue the tracking of the characteristic points in the immediately preceding captured image to be tracked.

For example, when the collation based on the SAD method is equal to or less than a predetermined threshold, the tracking unit 203 determines that tracking is not possible on grounds that the characteristic point has deviated from the angle of view of the camera. Moreover, when the characteristic point passes through a certain line prescribed in advance in the image or deviates from a predetermined region, the tracking unit 203 forcibly ends the tracking. The reason why the tracking is forcibly ended is because it is anticipated that the characteristic point will deviate from the angle of view of the camera 111 in the next captured image, and because the distance to the object is far and there is no longer any need to track the object. The tracking unit 203 proceeds to step S404 upon determining that it was possible to continue the tracking, and proceeds to step S405 upon determining that the tracking has ended.

In step S404, the tracking unit 203 records the coordinates of the tracked characteristic point in the line of the characteristic point to be processed and the column of time when the captured image to be processed was captured in the tracking point information 102A. In step S405, the tracking unit 203 records a mark such as "x" indicating that the tracking has ended in the line of the characteristic point to be processed and the column of time when the captured image to be processed was captured in the tracking point information 102A. When the execution of step S404 or step S405 is completed, the tracking unit 203 determines whether steps S402 to S405 have been executed for the characteristic points extracted in the immediately preceding captured image, returns to step S402 when there is any unprocessed characteristic point, and ends the flowchart of FIG. 7 when it is determined that the processing of all characteristic points is complete.

(Flowchart of Road Surface Estimation Unit 205)

Figure 8:
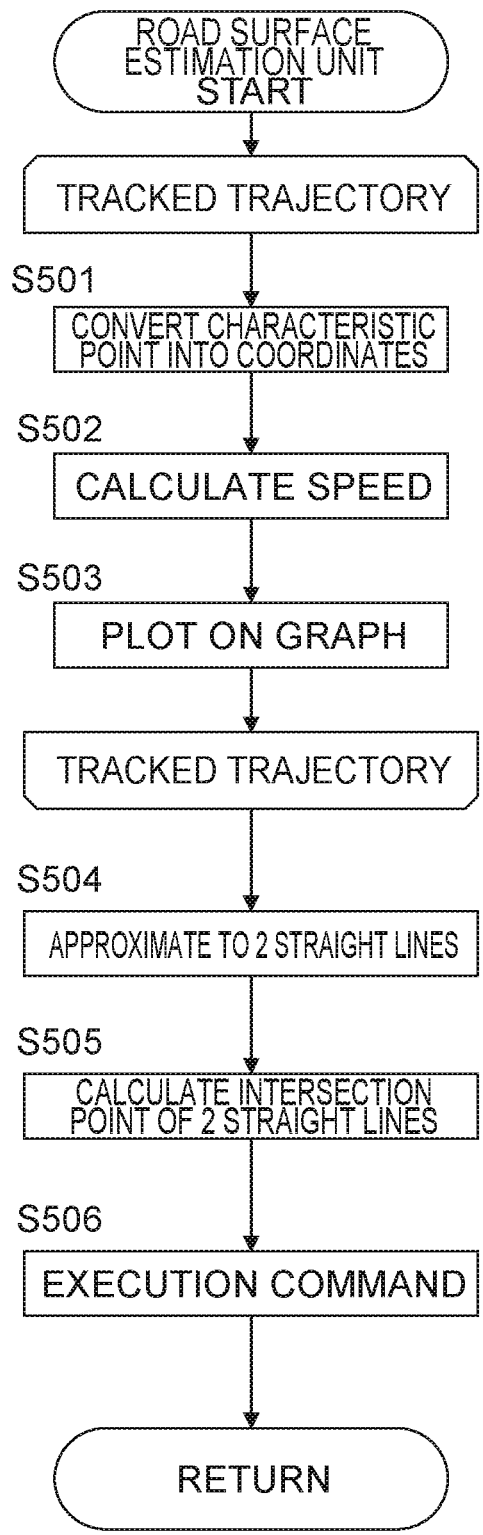
FIG. 8 is a flowchart showing the operation of the road surface estimation unit 205.

FIG. 8 is a flowchart showing the operation of the road surface estimation unit 205. The road surface estimation unit 205 executes the following operation each time a characteristic point sequence is sent from the accumulation unit 204. The execution subject of each step explained below is the CPU 101.

The road surface estimation unit 205 executes steps S501 to S503 explained below to all trajectories in which the tracking is complete and which are recorded in the characteristic point information 102A of the RAM 102. For example, the tracking point information 102A is as shown in FIG. 2(a), and in the processing immediately after time t5, the road surface estimation unit 205 executes steps S501 to S503 with each of the characteristic point 1001, the characteristic point 1003, and the characteristic point 1004 as the characteristic point trajectory to be processed. In step S501, the road surface estimation unit 205 performs overhead view conversion to the coordinates of the characteristic points configuring the trajectory to be processed based on the current external parameter 102C, and then proceeds to step S502. When the external parameter 102C does not coincide with the ideal external parameter, the trajectory that was subject to the overhead view conversion will not coincide with the ideal trajectory, but will be a trajectory that is generally close to the overhead viewpoint.

In step S502, the road surface estimation unit 205 calculates the travel speed of the trajectory to be processed. Specifically, the road surface estimation unit 205 calculates the travel speed by using the difference in the coordinates calculated in step S501 and the difference of each image capture time. For example, when the tracking point information 102A is as shown in the example of FIG. 2(a), since four coordinates are recorded as the characteristic point 1001, three combinations of the difference in the coordinates and the difference of the image capture time are calculated. Subsequently, three travel speeds are calculated by dividing the difference in the respective coordinates by the difference of each image capture time, and, for example, the average of such three travel speeds is used as the travel speed of the characteristic point 1001. Nevertheless, here, rather than using a simple average, weighting may be performed based on the size of the difference of the image capture time.

In step S503, the road surface estimation unit 205 plots, as shown in FIG. 4(c), the relation of the position of the trajectory to be processed in the width direction of the road and the travel speed. Nevertheless, in effect, plotting is not essential, and the correspondence of the position in the width direction of the road and the travel speed may be stored in the RAM 102 in substitute for plotting.

The road surface estimation unit 205 executes step S504 when the execution of steps S501 to S503 is completed regarding all trajectories, in which tracking is complete, stored in the characteristic point information 102A. In step S504, the road surface estimation unit 205 approximates the cross section of the road to two straight lines. In the example shown in FIG. 4(c), the processing of step S504 corresponds to calculating the formula of the straight line LV1 and the straight line LV2.

In subsequent step S505, the road surface estimation unit 205 calculates the position of the intersection point of the straight lines calculated in step S504. More specifically, the road surface estimation unit 205 calculates at which position in the width direction of the road that the two straight lines intersect. In the example shown in FIG. 4(c), the processing of step S505 corresponds to calculating the X coordinates of the vertex M in the spatial coordinate system. Note that, in the following explanation, the position where the two straight lines intersect in the width direction of the road is hereinafter referred to as the "vertex position". In subsequent step S506, the road surface estimation unit 205 outputs an execution command to the calculation unit 206, and then ends the processing shown in FIG. 8.

(Flowchart of Calculation Unit 206)

Figure 9:
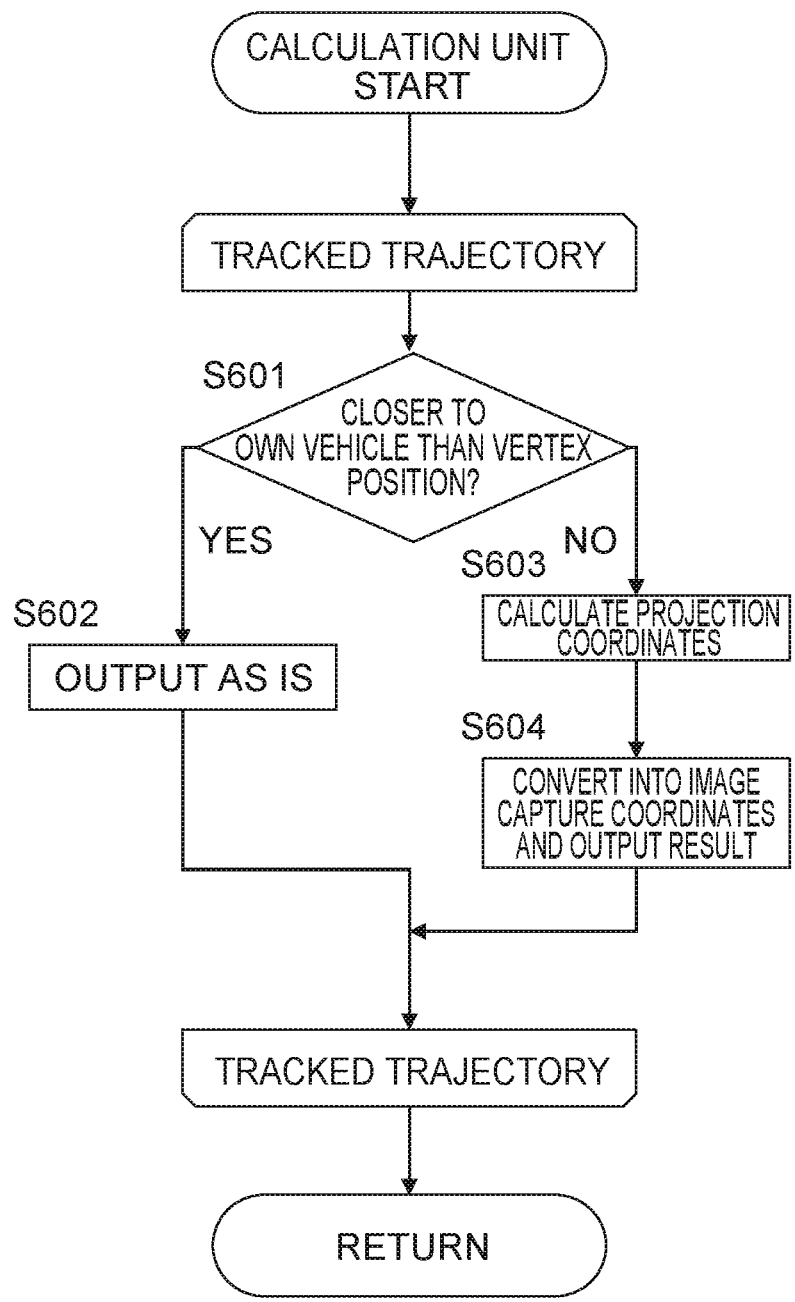
FIG. 9 is a flowchart showing the operation of the calculation unit 206.

FIG. 9 is a flowchart showing the operation of the calculation unit 206. The calculation unit 206 executes the following operation each time an execution command is sent from the road surface estimation unit 205. The execution subject of each step explained below is the CPU 101.

The calculation unit 206 executes steps S601 to S603 explained below to all trajectories in which the tracking is complete and which are recorded in the characteristic point information 102A of the RAM 102. In step S601, the calculation unit 206 determines whether the characteristic point trajectory to be processed exists more on the side of the own vehicle than the vertex position. Specifically, the calculation unit 206 determines whether the X coordinates of the characteristic point trajectory to be processed, which was subject to coordinate conversion by the road surface estimation unit 205, in the spatial coordinate system exist on the side of the own vehicle than the vertex position calculated by the road surface estimation unit 205 in step 3505. The calculation unit 206 proceeds to step S602 upon determining that the characteristic point trajectory to be processed exists more on the side of the own vehicle than the vertex position, and proceeds to step S603 upon determining that the characteristic point trajectory to be processed does not exist more on the side of the own vehicle than the vertex position.

In step S602, the calculation unit 206 directly outputs the coordinates of the characteristic point trajectory to be processed; that is, directly transcribes information from the tracking point information 102A to the corrected tracking point information 102B. In step S603, the calculation unit 206 calculates projection coordinates in which the coordinates of the characteristic points configuring the trajectory to be processed are projected on the flat surface where the own vehicle P exists. Specifically, while the coordinates corresponding to C2 are recorded regarding the characteristic point C1 in the tracking point information 102A as shown in FIG. 2(a), the calculation unit 206 calculates the coordinates of C3 as the projection coordinates.

In subsequent step S604, the calculation unit 206 converts the projection coordinates calculated in step S603 into the coordinates of the image coordinate system, and outputs the converted coordinates to the corrected tracking point information 102B. The calculation unit 206 ends the processing shown in FIG. 9 when the processing of step S602 or step S604 targeting all trajectories in which tracking is complete has ended.

(Operation of External Parameter Estimation Unit 208)

Figure 10:
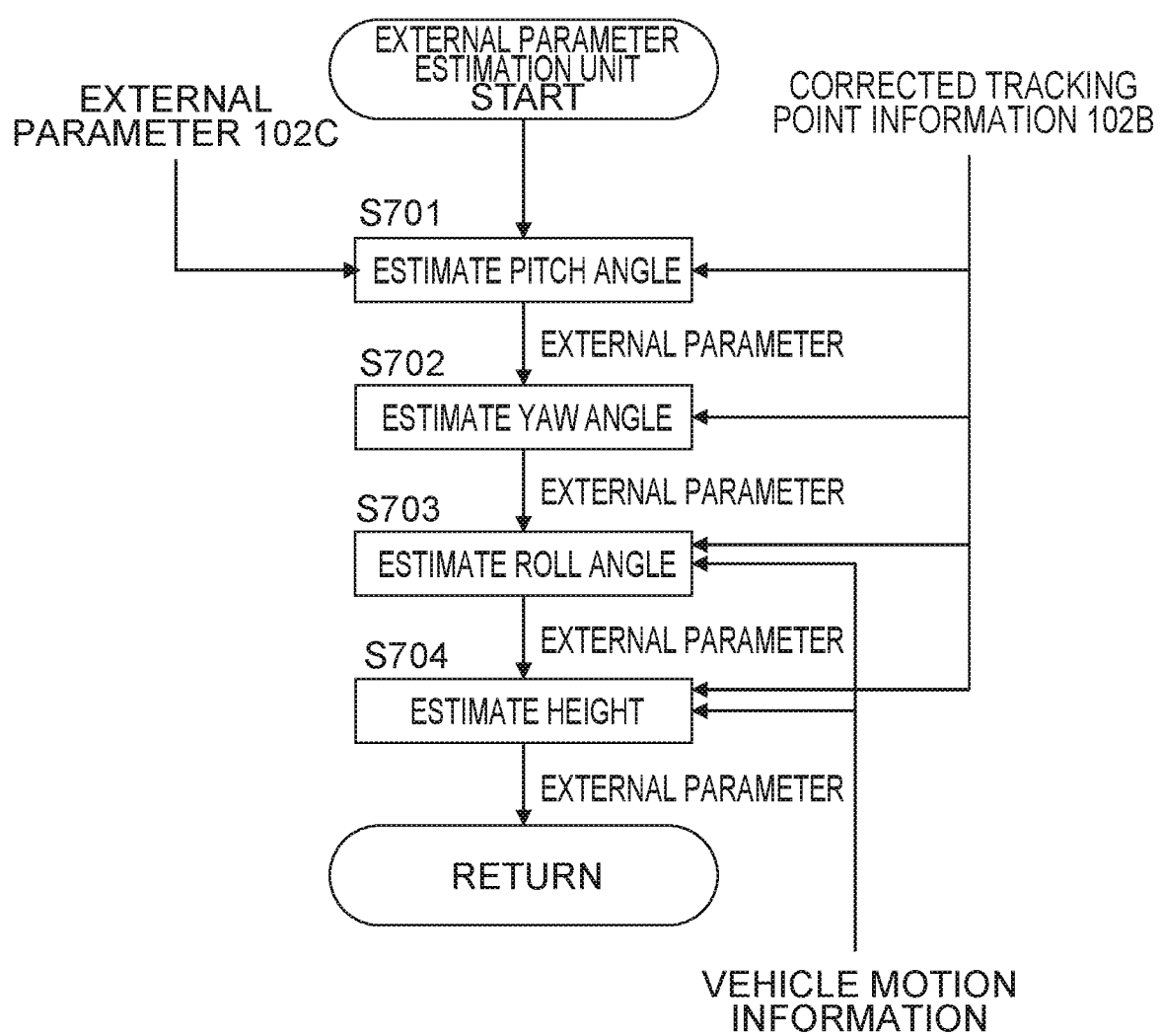
FIG. 10 is a flowchart showing the operation of the external parameter estimation unit 208.

FIG. 10 is a flowchart showing the operation of the external parameter estimation unit 208. The external parameter estimation unit 208 executes the following operation each time an execution command from the implementation determination unit 207 is received. The execution subject of each step explained below is the CPU 101.

In step S701, the external parameter estimation unit 208 performs pitch angle estimation. The external parameter estimation unit 208 uses, in the operation, the information of the characteristic point trajectory stored in the corrected tracking point information 102B, and the external parameter 102C stored in the RAM 102. The external parameter estimation unit 208 designs an objective function for evaluating the parallelism of the characteristic point trajectories, and pitch angle estimation is realized by minimizing such objective function in relation to the pitch angle based on known technology.

The objective function in step S701 is based on the function of evaluating the parallelism of two characteristic point trajectories. The external parameter estimation unit 208 creates a plurality of pairs of two characteristic point trajectories, and designs the sum of all objective functions as the objective function of pitch angle estimation. Accordingly, the pitch angle is corrected so that the overall characteristic point trajectories become as parallel as possible.

Note that the pair of the characteristic point trajectories is obtained by selecting one trajectory on the left side of the traveling direction and combining the trajectory on the left side and the trajectory on the right side from the center of the own vehicle; that is, the trajectory on the left side in the traveling direction and the trajectory on the right side in the traveling direction. The pairs of characteristic point trajectories may be all possible combinations or certain combinations selected therefrom. The external parameter estimation unit 208 rewrites the pitch angle of the read external parameter 102C with the pitch angle estimated in step S701, and stores the rewritten pitch angle in the RAM 102. To put it differently, the external parameter 102C stored in the RAM 102 is updated based on the processing of step S701.

In step S702, the external parameter estimation unit 208 performs yaw angle estimation. The external parameter estimation unit 208 uses, in the operation, the information of the characteristic point trajectory stored in the corrected tracking point information 102B, and the external parameter 102C updated based on the processing of step S701.

The external parameter estimation unit 208 designs an objective function for evaluating the verticality of the characteristic point trajectory; that is, the degree of the trajectory along the traveling direction in the overhead view. Subsequently, the external parameter estimation unit 208 realizes yaw angle estimation by minimizing such objective function in relation to the yaw angle based on known technology. The objective function in step 3702 is based on the function of evaluating the verticality of one characteristic point trajectory, and the sum of the objective functions related to all characteristic point trajectories is designed as the objective function of the pitch angle estimation. Accordingly, the yaw angle is calculated so that the overall characteristic point trajectory faces the vertical direction as much as possible. The external parameter estimation unit 208 rewrites the yaw angle of the read external parameter 102C with the yaw angle estimated in step S702, and stores the rewritten yaw angle in the RAM 102.

In step S703, the external parameter estimation unit 208 performs roll angle estimation. The external parameter estimation unit 208 uses, in the operation, the information of the characteristic point trajectory stored in the corrected tracking point information 102B, and the external parameter 102C updated based on the processing of step S702.

The external parameter estimation unit 208 designs an objective function for evaluating the difference in the length of the characteristic point trajectory of the trajectory on the left side and the trajectory on the right side from the center of the own vehicle, and realizes roll angle estimation by minimizing such objective function in relation to the roll angle based on known technology. The objective function in step S703 is designed as minimizing the difference between the average value of the length of all characteristic point trajectories on the left side of the own vehicle, and the average value of the length of all characteristic point trajectories on the right side of the own vehicle. Accordingly, the roll angle is corrected so that the difference between the length of the overall characteristic point trajectory on the left side of the own vehicle and the length of the overall characteristic point trajectory on the right side of the own vehicle becomes as small as possible; that is, so that the roll angle approaches the ideal overhead viewpoint. The external parameter estimation unit 208 rewrites the roll angle of the read external parameter 102C with the roll angle estimated in step S703, and stores the rewritten roll angle in the RAM 102.

In step S704, the external parameter estimation unit 208 performs height estimation. The external parameter estimation unit 208 uses, in the operation, the information of the characteristic point trajectory stored in the corrected tracking point information 102B, and the external parameter 102C updated based on the processing of step S703.

The external parameter estimation unit 208 realizes height estimation by minimizing the objective function representing the difference between the length of the characteristic point trajectory and the length of the ideal trajectory anticipated from the vehicle motion information in relation to the height based on known technology. The objective function is designed for minimizing the difference between the length of all characteristic point trajectories and the length of the ideal trajectory. Accordingly, the height is corrected so that the difference between the length of the overall characteristic point trajectory and the length of the ideal trajectory becomes as small as possible; that is, so that the height approaches the ideal overhead viewpoint. The external parameter estimation unit 208 rewrites the height of the read external parameter 102C and the height estimated in step S704, and stores the rewritten height in the RAM 102.

According to the first embodiment described above, the following effects are yielded.

(1) A calibration device 100 comprises a camera 111 to be mounted on a vehicle P traveling on a road surface, a characteristic point extraction unit 202 which extracts characteristic points from a captured image obtained by being captured with the camera 111, a tracking unit 203 which tracks the characteristic points extracted with the, a RAM 102 (storage unit) which stores a trajectory of the characteristic points obtained by tracking the characteristic points, a road surface estimation unit 205 which estimates a flat surface on which the vehicle is traveling by using the trajectory of the characteristic points, a calculation unit 206 which calculates a calibration trajectory, which is a trajectory of the characteristic points, for use in calibration based on the estimated flat surface, and an external parameter estimation unit 208 which executes calibration of an external parameter of the camera by using the calibration trajectory. Thus, even when the road surface in the periphery of the vehicle P is configured from a plurality of flat surfaces as shown in FIG. 4(b), high precision calibration of external parameters is possible.

(2) The calculation unit 206 calculates as the calibration trajectory, among trajectories of the characteristic points stored in the tracking point information 102A, a trajectory of the characteristic points existing on a same plane as a contact area of the vehicle P (S601 of FIG. 9: YES, S602). It is thereby possible to reliably provide the characteristic points existing on the same plane for use in calibration of external parameters.

(3) The calculation unit 206 calculates the calibration trajectory by correcting coordinates configuring a trajectory of the characteristic points not existing on a same plane as a contact area of the vehicle among trajectories of the characteristic points stored in the tracking point information 102A as coordinates on a same plane as a contact area of the vehicle (S601 of FIG. 9: NO, S603, S604). It is thereby possible to use the trajectory of the characteristic points not on a same plane as the contact area of the vehicle; for instance, the trajectory of the characteristic points existing on the second plane S12 of FIG. 4(b), can also be used for calibration.

(4) The road surface estimation unit 205 estimates a flat surface on which the vehicle P is traveling by assuming that a shape of the road surface is a combination of two flat surfaces. It is thereby possible to estimate the road surface based on a simple calculation.

(5) As shown in Formula 1 to Formula 4, the calculation unit 206 calculates a plurality of approximation straight lines from the distribution of the characteristic point trajectories, and calculates, from an intersection point of the plurality of approximation straight lines, an angular difference θ formed from a first plane S11 as a contact area of the vehicle P and a second plane S12 opposite to the first plane S11 relative to the intersection point. It is thereby possible to correct the coordinates of the characteristic points by using the angular difference θ.

Modified Example 1

In the embodiment described above, the vehicle motion acquisition unit 210 of the calibration device 100 receives the output from the speed sensor 105 and the rudder angle sensor 106. Nevertheless, the vehicle motion acquisition unit 210 may also receive, as the input, the position information of the own vehicle P. For example, when the own vehicle P comprises a GPS receiver, the position information of the vehicle P from the GPS receiver may be input to the vehicle motion acquisition unit 210, and the vehicle motion acquisition unit 210 may directly output the input position information as the vehicle motion information to the in-motion calibration program 103A. Note that the GPS receiver receives radio waves from a plurality of satellites configuring a global navigation satellite system, and calculates the position, or latitude and longitude, of the own vehicle P by analyzing the signals included in the radio waves.

Modified Example 2

The calibration device 100 does not need to comprise the implementation determination unit 207 and/or the adoption determination unit 209. If the calibration device 100 does not comprise either the implementation determination unit 207 or the adoption determination unit 209, processing is executed in the same manner as though the configuration not comprising the implementation determination unit 207 or the adoption determination unit 209 made a negative determination. For example, when the calibration device 100 does not comprise either the implementation determination unit 207 or the adoption determination unit 209, the following processing is performed when the accumulation unit 204 records the characteristic point trajectory in the RAM 102. That is, the external parameter estimation unit 208 estimates the external parameter 102C, and the external parameter estimation unit 208 directly records the estimated external parameter 102C as the external parameter 112A in the flash memory 112.

Modified Example 3

The calculation unit 206 does not need to calculate the projection coordinates. In the foregoing case, the calculation unit 206 does not execute the processing of steps S603 and S604 when a negative determination is made in step S601 of FIG. 9, and the next tracked trajectory is set as the processing target. According to this modified example, there is an advantage in that only the characteristic points existing on the same plane as the contact area of the vehicle P are used for calibration, and the amount of calculation based on the calculation of the projection coordinates can be reduced.

Modified Example 4

The calculation unit 206 may calculate the road surface by assuming that the road surface is configured from three or more flat surfaces.

Modified Example 5

The camera 111 may also be built in the calibration device 100.

Second Embodiment

The second embodiment of the calibration device according to the present invention is now explained with reference to FIG. 11 to FIG. 12. In the following explanation, the same reference numeral is given to the same constituent element as the first embodiment, and the differences are mainly explained. Points that are not specifically explained are the same as the first embodiment. In this embodiment, the calculation method of the road surface with which the vehicle is in contact mainly differs from the first embodiment.

The calibration device 100 in this embodiment and the configuration of the vehicle P comprising the calibration device 100 are the same as the first embodiment. Nevertheless, the operation of the calculation unit 206 is different from the first embodiment.

In this embodiment, the road surface estimation unit 205 estimates the flat surface on which the vehicle P travels by using the trajectory of the characteristic points existing in a region where the vehicle P travels; that is, a region of the horizontal width of the vehicle P of the entire width of the road (these are hereinafter referred to as the "vehicle underside characteristic points"). Subsequently, the road surface estimation unit 205 determines that, among the trajectories existing in the region where the vehicle P will not travel, a trajectory in which the relation of the position and the travel speed coincides with the vehicle underside characteristic points exists on the flat surface on which the vehicle P travels, and a trajectory in which such relation does not coincide with the vehicle underside characteristic points does not exist on the flat surface on which the vehicle P travels.

Figure 11A:
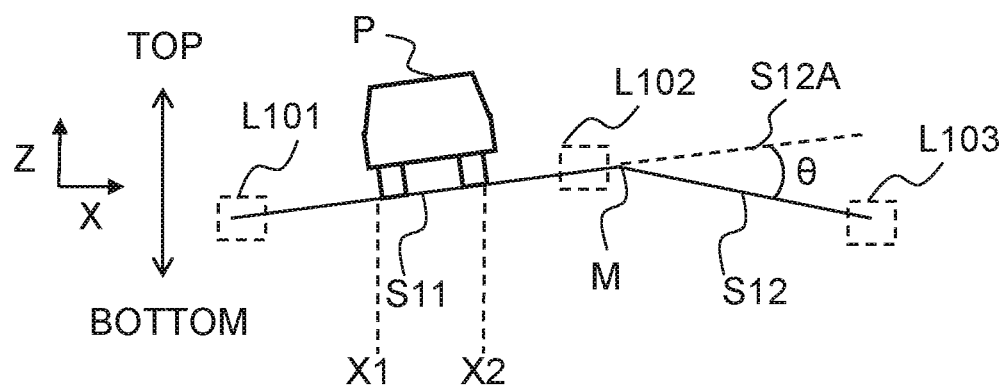
FIG. 11 is a diagram showing the operation of the road surface estimation unit 205 in the second embodiment.

FIG. 11 is a diagram explaining the operation of the road surface estimation unit 205 in the second embodiment. FIG. 11(*a*) and FIG. 11(*b*) respectively correspond to FIG. 4(*b*) and FIG. 4(*c*) in the first embodiment. Nevertheless, X1 and X2 indicating the coordinates outside the tires have been added to FIG. 11(*a*). Note that X1 and X2 are values of the X coordinates. Straight lines LV11 to LV13 have been added to FIG. 11(*b*) in substitute for the straight line LV1 shown in FIG. 4(*c*).

In this embodiment, the calculation unit 206 calculates the straight line LV11 showing the relation of the X direction position and speed by using the trajectory of the characteristic points in the region where the vehicle P travels. In the example shown in FIG. 11(*b*), the calculation unit 206 calculates the straight line LV11 based on regression analysis, for example, by using the position and speed of the characteristic point trajectories C21 to C23 existing in the region of the tires of the vehicle P and the inner region thereof. Subsequently, the calculation unit 206 extends the calculated straight line LV11 in both the plus direction and the minus direction of the X axis, and identifies the range in which the deviation from the characteristic point trajectory falls within a range that is equal to or less than a predetermined value. In the example shown in FIG. 11(b), the straight line in which the straight line LV11 has been extended in the minus direction of the X axis is referred to as the straight line LV12, and the straight line in which the straight line LV11 has been extended in the plus direction of the X axis is referred to as the straight line LV13.

Figure 11B:
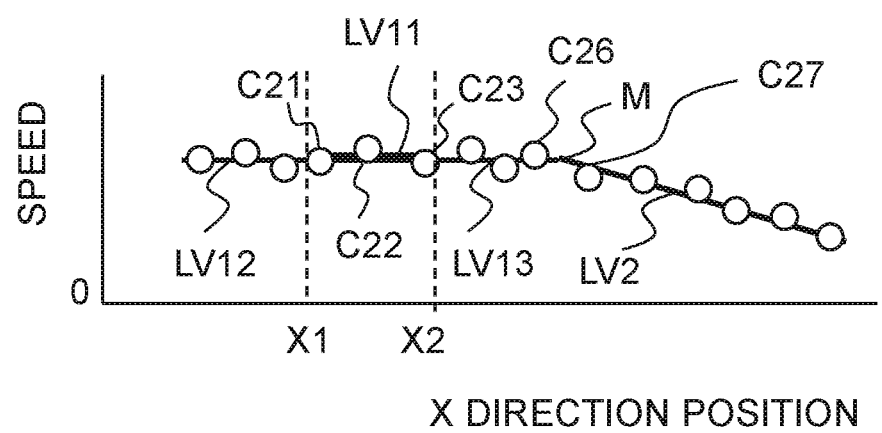

The calculation unit 206 determines that the distance to the straight line LV11 is a predetermined value or less up to the characteristic point trajectory C26 from the left end of FIG. 11(b) to near the center of FIG. 11(b), and that the distance to the straight line LV11 is greater than a predetermined value for the characteristic point trajectory C27 and the characteristic point trajectory that is more on the right side in the diagram than the characteristic point trajectory C27. Thus, the road surface estimation unit 205 extends the straight line LV13 only up to the characteristic point trajectory C26. Subsequently, the calculation unit 206 calculates the straight line LV2 by approximating the characteristic point trajectory C27 and the characteristic point trajectory that is more on the right side in the diagram than the characteristic point trajectory C27 to a straight line. Finally, the road surface estimation unit 205 sets the intersection point of the straight line obtained by extending the straight line LV11, and the straight line LV2, as the vertex M. Nevertheless, the road surface estimation unit 205 may also set the X coordinates in the middle of the characteristic point trajectory C26 and the characteristic point trajectory C27 as the coordinates of the vertex M.

(Flowchart of Road Surface Estimation Unit 205)

Figure 12:
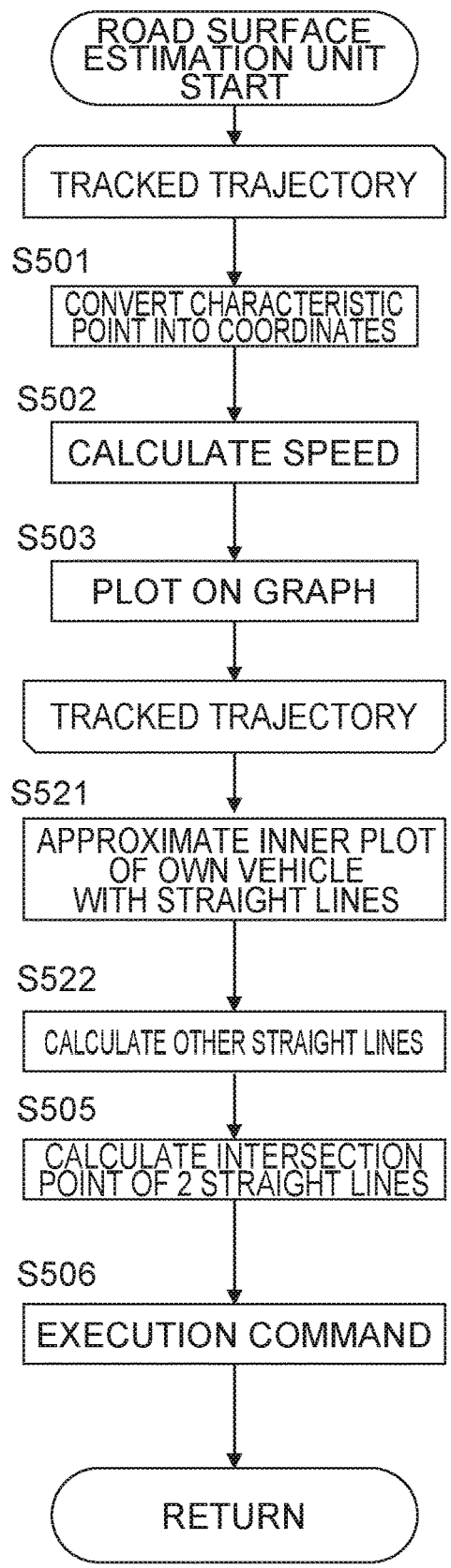
FIG. 12 is a flowchart showing the operation of the road surface estimation unit 205 in the second embodiment.

FIG. 12 is a flowchart showing the operation of the road surface estimation unit 205 in the second embodiment. In FIG. 12, the same step number is given to the same processing as the first embodiment, and the explanation thereof is omitted. Since the first half of the processing of the road surface estimation unit; that is, performing the processing of steps S501 to S503 to all trajectories in which tracking is complete is the same as the first embodiment, the explanation thereof is omitted. Next, the road surface estimation unit 205 approximates the inner plot of the own vehicle P with a straight line in step S521. The processing of step S521 corresponds to calculating the straight line LV11 using the characteristic point trajectories C21 to C23 in the example shown in FIG. 11(b).

In subsequent step S522, the road surface estimation unit 205 calculates another straight line by using a characteristic point trajectory that is farther from the straight line calculated in step S521 by a predetermined distance. The processing of step S522 corresponds to calculating the straight line LV2 by using the characteristic point trajectory C27 and the characteristic point trajectory that is more on the right side in the diagram than the characteristic point trajectory C27 in the example shown in FIG. 11(b). In subsequent step S505, the road surface estimation unit 205 calculates the intersection point of the straight line LV11 and the straight line LV2; that is, calculates the intersection position. In subsequent step S506, the road surface estimation unit 205 outputs an execution command to the calculation unit 206 and ends the processing shown in FIG. 12.

According to the second embodiment described above, the following effects are yielded.

(6) The road surface estimation unit 205 estimates the flat surface on which the vehicle P travels by using the trajectory of the characteristic point in the region where the vehicle P travels. Thus, even when there is a deviation in the distribution of passengers or luggage of the vehicle P and the vehicle P is inclined relative to the road surface, the flat surface including the contact area of the vehicle P can be accurately calculated.

While the programs were stored in the ROM 103 in each of the embodiments and modified examples described above, the programs may also be stored in the flash memory 112. Moreover, the calibration device 100 may also comprise an I/O interface (not shown), and programs may be read from another device via the I/O interface and a medium that can be used by the calibration device 100 as needed. Here, a medium refers to, for example, a storage medium that can be attached to and detached from the I/O interface, or a communication medium; that is, a cable, wireless or optical network, or carrier waves or digital signals that propagate the network. Moreover, a part or all of the functions realized based on the programs may be realized with a hardware circuit or FPGA.

Each of the embodiments and modified examples explained above may also be combined. While various embodiments and modified examples were explained above, the present invention is not limited to the subject matter thereof. Other modes considered to fall within the technical scope of the present invention also fall within the scope of the present invention.

The disclosure of the following priority application is incorporated herein by reference. Japanese Patent Application No. 2019-52738 (filed on Mar. 20, 2019)

REFERENCE SIGNS LIST

100 . . . calibration device
102A . . . tracking point information
102B . . . corrected tracking point information
102C, 112A . . . external parameter
103C . . . external parameter initial value
111 . . . camera
112 . . . flash memory
201 . . . image acquisition unit
202 . . . characteristic point extraction unit
203 . . . tracking unit
204 . . . accumulation unit
205 . . . road surface estimation unit
206 . . . calculation unit
207 . . . implementation determination unit
208 . . . external parameter estimation unit

The invention claimed is:

1. A calibration device, comprising:
a camera to be mounted on a vehicle traveling on a road surface;
a characteristic point extraction unit configured to extract characteristic points from a captured image obtained by being captured with the camera;
a tracking unit configured to track the characteristic points extracted with the characteristic point extraction unit;
a storage unit configured to store a trajectory of the characteristic points obtained by tracking the characteristic points;
a road surface estimation unit configured to estimate a flat surface on which the vehicle is traveling by using the trajectory of the characteristic points;
a calculation unit configured to calculate a calibration trajectory, which is a trajectory of the characteristic points, for use in calibration based on the estimated flat surface; and
an external parameter estimation unit configured to execute calibration of an external parameter of the camera by using the calibration trajectory.

2. The calibration device according to claim 1,
wherein the calculation unit calculates as the calibration trajectory, among trajectories of the characteristic points stored in the storage unit, a trajectory of the characteristic points existing on a same plane as a contact area of the vehicle.

3. The calibration device according to claim 1,
wherein the calculation unit calculates the calibration trajectory by correcting coordinates configuring a trajectory of the characteristic points not existing on a same plane as a contact area of the vehicle among trajectories of the characteristic points stored in the storage unit as coordinates on a same plane as a contact area of the vehicle.

4. The calibration device according to claim 3,
wherein the calculation unit calculates a plurality of approximation straight lines from a distribution of trajectories of the characteristic points, and calculates, from an intersection point of the plurality of approximation straight lines, an angular difference formed from a first plane as a contact area of the vehicle and a second plane opposite to the first plane relative to the intersection point.

5. The calibration device according to claim 1,
wherein the road surface estimation unit estimates a flat surface on which the vehicle is traveling by assuming that a shape of the road surface is a combination of two flat surfaces.

6. The calibration device according to claim 1,
wherein the road surface estimation unit estimates a flat surface on which the vehicle is traveling by using a trajectory of the characteristic points in a region where the vehicle is traveling.

7. A calibration method to be executed by a calibration device mounted on a vehicle traveling on a road surface and comprising a camera and a storage unit, comprising the steps of:
extracting characteristic points from a captured image obtained by being captured with the camera and tracking the characteristic points;
storing a trajectory of the characteristic points obtained by tracking the characteristic points in the storage unit;
estimating a flat surface on which the vehicle is traveling by using the trajectory of the characteristic points;
calculating a calibration trajectory, which is a trajectory of the characteristic points, for use in calibration based on the estimated flat surface; and
executing calibration of an external parameter of the camera by using the calibration trajectory.

* * * * *